Dec. 19, 1939.    W. C. CRISP ET AL    2,183,548
TIMING DEVICE
Filed Aug. 16, 1935    3 Sheets-Sheet 1

INVENTORS
Wilbur C. Crisp
and William E. Barnes
by Parker, Rockwow & Farmer
ATTORNEYS Dec. 19, 1939.   W. C. CRISP ET AL   2,183,548
TIMING DEVICE
Filed Aug. 16, 1935   3 Sheets-Sheet 2

Patented Dec. 19, 1939

2,183,548

UNITED STATES PATENT OFFICE 2,183,548

TIMING DEVICE

Wilbur C. Crisp and William E. Barnes,
Little Falls, N. Y.

Application August 16, 1935, Serial No. 36,532

9 Claims. (Cl. 161—17)

This invention relates to timing devices of the type adapted for the timing of games and contests, such as athletic contests. Many athletic contests, particularly basketball and football, continue for periods of definite lengths and, upon request of either team, time-out periods of definite duration are frequently allowed, which time-out periods are not computed as a part of the playing period of fixed duration.

An object of this invention is to provide an improved timer of this type, which will accurately measure and indicate playing or contest periods of definite, predetermined lengths, with which the measurement and indication of the passing of time in such a contest period may be stopped at will for any desired number of time-out periods and then resumed, with which such time-out periods may be accurately measured automatically and the termination of each period audibly indicated, with which the termination of the contest period of predetermined duration may be audibly indicated, with which the visual indicator for the contest period will always indicate directly the duration of the remaining time of the period, with which drift of the visual indicating means and their operating means, when time-out periods are taken, will be reduced to a minimum automatically, with which the visual indicating means may be easily and rapidly reset at will, with which visual indicating means of large size may be provided for the spectators to indicate directly time remaining in each contest period, and may be located at a substantial distance from the controlling mechanism, and which will be relatively simple, compact, dependable, practical, convenient and inexpensive.

Another object of the invention is to improve and simplify timers for athletic and other contests, and to reduce the liability and possibility of error in the measurement and indication of the time periods for any contest, and which will have maximum flexibility and ease of control.

Various other objects and advantages will be apparent from the following description of an embodiment of the invention, and the novel features will be particularly pointed out hereinafter in connection with the appended claims. In the accompanying drawings:

Fig. 15 is another sectional elevation of the same, the section being taken approximately along the line 15—15 of Fig. 14; and Fig. 16 is a sectional plan of the same, the section being taken approximately along the line 16—16 of Fig. 14.

Figure 1:
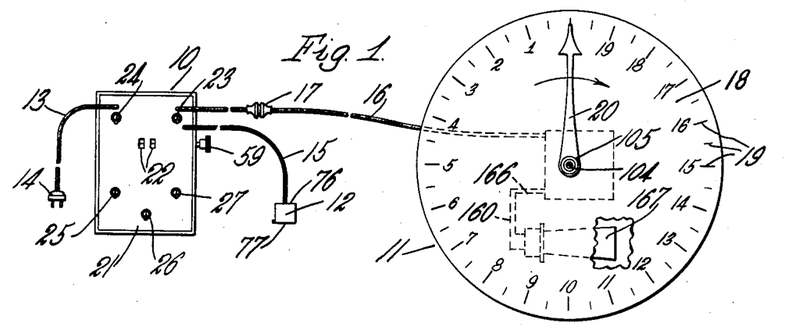
Fig. 1 is an elevation of a timer constructed in accordance with this invention.

In the illustrated embodiment of the invention, the timer includes a control box 10, a spectator's clock 11, and a cartridge firing device 12. The assembled device is shown in Fig. 1, and current for its operation is obtained through a connecting, twin cable wire 13 leading from the control box 10 and terminating in the usual two prong connecting plug 14. A twin cable 15 connects the control box 10 with the cartridge mounting and firing device 12, and a multi-wire cable 16 having a detachable coupling 17 in series therein, connects the control box 10 with the mechanism of the spectator's clock 11. The dial face 18 of the spectator's clock 11 is provided with graduations 19 extending thereon progressively from a zero position.

By way of example, the illustrated timer is built for indicating basketball periods of twenty minutes each, exclusive of time-out periods. For this example, the graduations 19 on the spectator's clock indicate minutes and fractions thereof equal to a range of twenty minutes back to the starting point. The spectator's clock also includes a visual indicating hand 20 which is mounted to rotate about an axis approximately centrally of the dial face, and to travel along the graduations through a complete circle. The direction of travel of the hand 20 during a contest period is in the direction of the arrow in Fig. 1, and it will be noted that in its travel it always indicates directly the time still remaining of the contest period, or the number of minutes yet to be played in the contest period.

Figure 2:
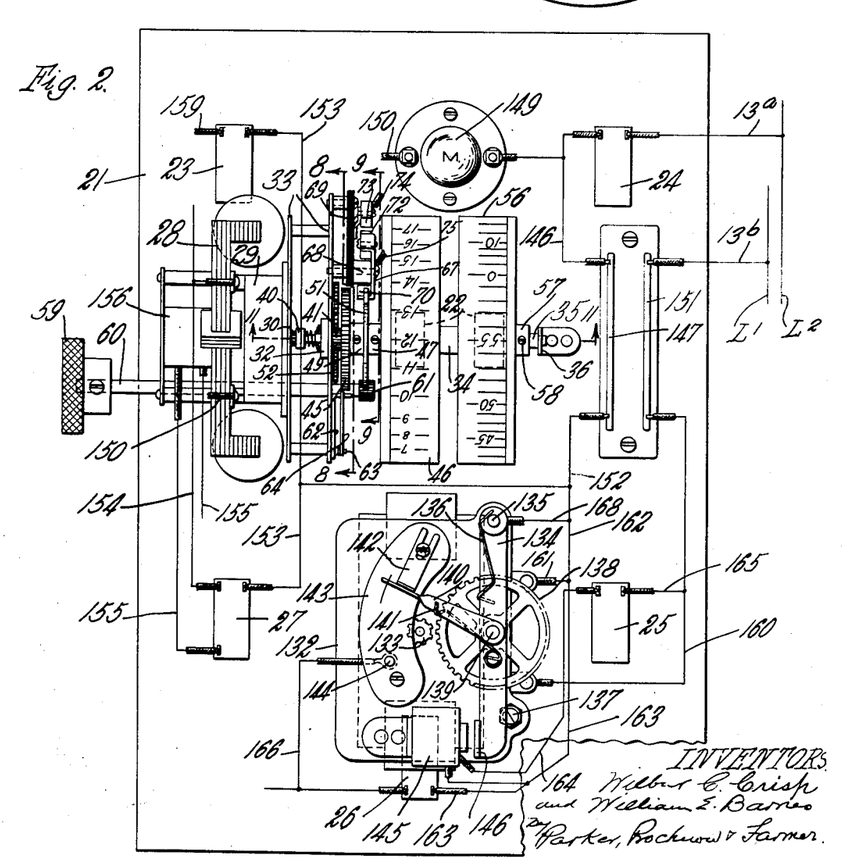
Fig. 2 is an inside or bottom plan of the mechanism of the control box and illustrating the appearance of the mechanism which is mounted on the under or inner face of the cover or panel of the control box which is shown in Fig. 1.

The control box 10 includes a suitable housing having a panel or face 21 with sight windows 22 therein, and mounting a plurality of manually operated switches 23, 24, 25, 26 and 27, the switch 27 being of the double throw type. The control mechanism contained in the control box is mounted on the under or inner face of the panel 21, as shown in Fig. 2, and includes a constant speed, electric motor 28 which preferably is of the alternating current, synchronous type. The armature or rotor of this motor is connected through a suitable speed reduction gear mechanism 29 to a pinion 30, Figs. 2 and 11, and is very similar to the synchronous electric motor clocks now in common use.

A sleeve 31 (Fig. 11) is mounted for rotation in a bearing block 32 which is carried by a plate 33, and this sleeve 31 is connected by a telescopic coupling 34 with a shaft 35 which also telescopes with the coupling 34 and is disposed in axial alignment with the sleeve 31. The free end of the shaft 35 is reduced and rotatably mounted in a bearing bracket 36. The coupling 34 may be detachably fixed to the sleeve 31 and the shaft 35 in any suitable manner, such as by set screws 37. Another shaft 38 has a head 39 disposed within the coupling 34 between the inner end of the shaft 35 and the adjacent end of the sleeve 31.

Figures 8, 9, 10, 11:
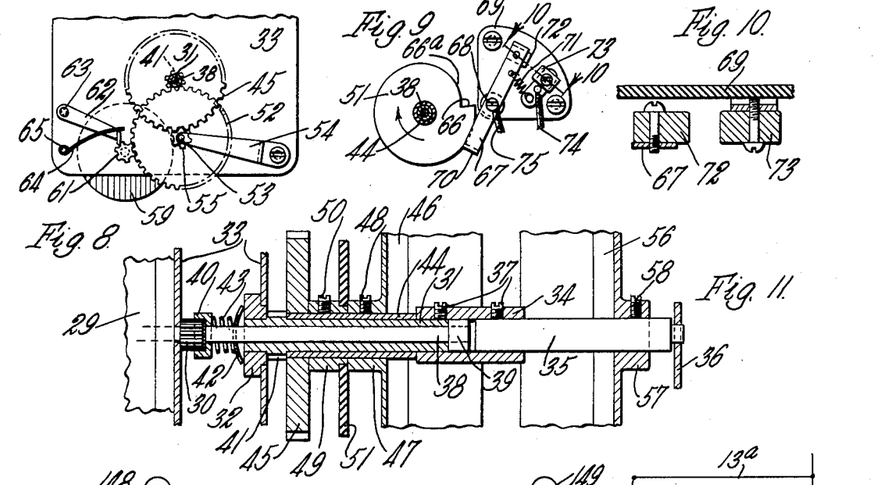
Fig. 8 is a sectional elevation of part of the control mechanism shown in Fig. 2, the section being taken approximately along the line 8—8 of Fig. 2.
Fig. 9 is a sectional elevation of another part of the control mechanism for initiating the firing of a cartridge, the section being taken approximately along the line 9—9 of Fig. 2.
Fig. 10 is a sectional view through the circuit closer which fires the shell, the section being taken approximately along the line 10—10 of Fig. 9.
Fig. 11 is a sectional elevation through the control mechanism, the section being taken approximately along the line 11—11 of Fig. 2.

The shaft 38 extends through the sleeve 31, is axially aligned with the pinion 30, and carries a cup-shaped element 40 which telescopes over the adjacent end of the pinion 30 and has internal teeth meshing with the teeth of the pinion 30, so as to provide a driving, but endwise sliding, connection between the pinion 30 and the shaft 38. The sleeve 31 carries an enlarged section with teeth forming a pinion 41 which abuts endwise against a face of the bearing 32 and limits movement of the sleeve 31 toward the pinion 30.

A dished washer 42 fits over the shaft 38 and abuts against the bearing 32 so as to act as an abutment for one end of a helical spring 43 which also surrounds the shaft 38 and is compressed between the cup-shaped member 40 and the washer 42. The spring 43 thus urges the shaft 38 endwise towards the pinion 30 and shifts the head 39 of the shaft 38 against the end of the sleeve 31, so as to provide a frictional drive between the shaft 38 and the sleeve 31. The cup-shaped element 40, by its telescopic fit over the pinion 30, is free to slide endwise along the pinion 30 to a limited extent, while being rotatably driven from the pinion 30.

Another sleeve 44 is rotatably mounted on the sleeve 31 between the coupling 34 and the pinion 41. This sleeve 44, at the end adjacent the pinion 41, mounts a gear 45 and at the end adjacent the coupling mounts a barrel or minutes dial cylinder 46 (see Figs. 2 and 11). The barrel or cylinder 46 may have a hub 47 which fits the sleeve 44, and a set screw 48 serves to secure the cylinder 46 to the sleeve 44. A bushing 49 is secured on the sleeve 44 between the gear 45 and the hub 47 of the cylinder in any suitable manner, such as by a set screw 50, and a cam 51 of insulating material is adjustably clamped on a shoulder of the bushing 49 by the abutting end of the hub 47.

The pinion 41 of the sleeve 31 meshes with and drives a gear 52 (Figs. 2 and 8) which is carried by a shaft 53 (Fig. 8) that is rotatably mounted in the plate 33 and in a bracket 54 carried by the plate. The shaft 53 also carries a pinion 55 which meshes with and drives the gear 45 that is mounted on the sleeve 44. The pinion 41, gear 52, pinion 55 and gear 45 constitutes a dial train by which the cylinder 46 is driven at a rate of speed which is lower than the rate of speed of the shaft 35 and the sleeve 31. A seconds dial cylinder 56 (Figs. 2 and 11) is provided with a hub 57 which fits upon the shaft 35 and is secured thereto in any suitable manner such as by a set screw 58. We thus have two dial cylinders 46 and 56 disposed end to end and rotating about the same axis but at different speeds.

The dial cylinder 56, upon its outer periphery, carries graduations from zero to sixty representing seconds of time, and the gear ratio between the shaft 35 and the motor 28 is such that when the motor runs at its constant speed, the seconds dial cylinder 56 will rotate once in each minute of time. The cylinder 46 also carries, on its periphery, graduations representing minutes, and when the timer is used for basketball games the graduations of cylinder 46 are preferably from zero to twenty, with a space between zero and twenty, to represent twenty minutes as the contest period. The gear ratio between the pinion 41 and the gear 45 is such as to cause the cylinder 46 to move from the graduation twenty to zero during exactly twenty minutes.

The direction of rotation is such that the graduations on the minutes cylinder 46 will read in a decreasing direction, that is, will indicate the time remaining or to be played in the game instead of the time already played, so that one may know immediately, without computation and upon inspection of the dial cylinders 46 and 56, the time remaining to be played in each period. The dial cylinders 46 and 56 are disposed in alignment with the windows 22 in the panel 21, so that graduations on the dials will be visual through those windows and will indicate directly the amount of time yet to be played in a contest period.

In order to reset the dials 46 and 56 to starting positions in which the dials together indicate exactly the full contest period and which, in a basketball timer, will be twenty minutes, I have provided a resetting knob 59 mounted on a spindle 60 (Fig. 2) which is mounted to slide endwise of itself and rotate in the frame of motor 28. The inner end of the spindle 60 carries a pinion 61 which, when the button 59 is shifted inwardly, is disengaged from the gear 52. When the button 59 is pulled outwardly, the pinion 61 is shifted into meshing engagement with the gear 52, as shown in Fig. 8, whereupon if the button 59 is then turned, the dial train and the sleeve 31 and 44 will be rotated. This rotation may be continued until the dials are properly set at starting position, such as to indicate an even twenty minutes when viewed through the windows 22.

As the pinion 61 moves into meshing engagement with the gear 52, it also moves into meshing engagement with a ratchet pawl 62 which is pivoted at 63. A leaf spring 64, anchored at 65, bears upon the pawl 62 and urges it yieldingly into meshing engagement with the pinion 61, but when the pinion 61 is shifted out of engagement with the pawl 62, the latter will be shifted by the spring 64 into engagement with the spindle or stem 60 which acts as a stop for the pawl. Obviously any other stop for the pawl 62 may be employed. The pawl 62 is positioned to act as a ratchet pawl on the pinion, as shown in Fig. 8 and limit rotation of the dial train and dials to the direction in which the dials 46 and 56 are normally driven by the motor and prevents reverse movement. The periphery of cam 51 has an abrupt shoulder 66, Fig. 9, and an elevating cam section 66a.

A switch arm 67 is pivoted at 68 on a base 69 of insulating material, and the arm 67 extends beyond its pivot 68 and terminates in a flanged end 70, Figs. 2 and 9, which rides upon the periphery of the cam 51. A spring 71 urges the switch arm 67 in a direction to press the flanged end 70 of the switch arm against the periphery of the cam 51, so that when the abrupt shoulder 66 of the cam is brought into alignment with the flanged end 70, the spring 71 will rock the switch arm in a direction to carry the contact 72 thereof into engagement with a terminal contact 73 and complete a circuit between the wires 74 and 75.

The cam 51 rotates with the dial cylinder 46 in the direction of the arrow in Fig. 9 and, therefore, once for each revolution of the cam 51 and cylinder 46, the shoulder 66 is brought into alignment with the flanged end 70 of the switch arm and the circuit to the shell firing device 12 is closed. Immediately upon further rotation of the cam 51, the flanged end 70 of the switch arm will be cammed outwardly to open the shell firing circuit at the contacts 72 and 73. The cam 51 is so positioned on the bushing 49 that its shoulder 66 moves into alignment with the flanged end 70 with the switch arm exactly at the time the zero graduation on the minutes dial cylinder 46 becomes centered in its window 22.

The dial graduation indicating the maximum length of the contest period, which is set at a window 22 when the device is ready to start, and which would be the numeral 20 in a basketball timer, is spaced from the zero graduation a substantial distance in a peripheral direction, so that at the start of the game or contest period the cam 51 will be in a position in which it has cammed the switch arm 67 into open circuit position. Were the start and stop positions of the dial cylinders not made materially different, then the switch arm 67 would be in closed position at the start of the operation and the shell would be fired as soon as the timer was prepared for the start of a contest.

The shell firing device 12, shown in Figs. 1, 14, 15 and 16, includes a housing having, as one wall thereof, a plate 76 of insulating material. The end wall 77 of the housing, at the end opposite from the plate 76, is connected along one edge by a hinge 78 to the housing, and a flange 79 on an edge of the hinged end wall 77 is adapted to engage with a lug on the housing to latch the end wall 77 releasably in closed position. Within the housing and at the end adjacent the plate 76, is a block 80 of insulating material having an L-shaped metallic plate 81 fitting an angular portion thereof in a suitable recess 82.

One of the wires from the firing switch, such as the wire 74, is connected to the plate 81, as shown in Fig. 15, and another wire 74a is grounded to the metal casing or housing of the device 12. A metallic plunger 83 is disposed in a passage 84 in the insulating block 80 and the plate 81 extends across the upper end of the passage 84. The plate 81 has an aperture which guides the upper end of the plunger 83 and a spring 85 surrounds the plunger 83 and is compressed between the plate 81 and a head 86 of the plunger, so as to urge the head 86 downwardly while forming an electrical connection between the plunger and the plate 81.

The head 86 is guided in a recess 87 of block 80 and the end of the plunger 83 which passes through the plate 81 may be upset to limit the extent of movement of the plunger by the spring 85. The hinged end wall 77 carries on its inner face a block 88 of insulating material and this block 88 is provided with a passage 89 which continues through an opening in the wall 77. A blank cartridge shell 90 is removably mounted in the passage 89 at the inner face of the block 88, so that when the block 88 is swung into the housing by a closing of the wall 77, the head of the cartridge will be carried into contact with the head 86 of the plunger 83, and will shift the plunger 83 endwise to a limited extent against the action of the spring 85, as shown in Fig. 14.

Figures 4, 5, 6, 7:
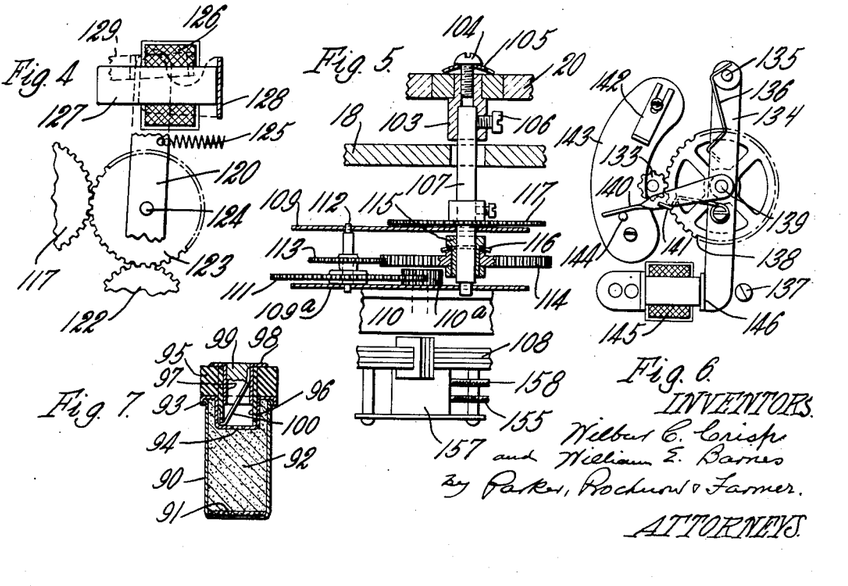
Fig. 4 is an elevation of a part of the mechanism shown in Fig. 3 to illustrate the positions of some of the parts while the spectator's clock hand is being reset.
Fig. 5 is a sectional view on the line 5—5 of Fig. 3.
Fig. 6 is an elevation of the time-out mechanism shown in Fig. 2, with the parts in the positions occupied at the end of a time-out period.
Fig. 7 is a sectional elevation through one of the cartridges, which is fired electrically to create an audible signal at the end of a playing period.

Referring now particularly to Fig. 7, the blank cartridge 90 includes a metallic shell closed at one end by wad 91 and carrying in its chamber a charge of powder 92. The other end of the shell is closed by a cup-shaped, metallic cap 93 which is flanged over the metallic shell, with the cup portion extending into the body of the shell and with the open face of the cup facing outwardly. The bottom wall of the cup-shaped portion is provided with an aperture 94. A somewhat cylindrical, fiber sleeve or block 95 abuts against the end of the cap 93, and has a reduced, cylindrical portion 96 extending endwise thereof into the cup-shaped portion of cap 93. The block 95 and the reduced sleeve portion 96 have a common passage from end face to end face.

A tubular bushing or element 97 of metal is fitted into the outer end of the passage in the sleeve 95 and is provided at its outer end with a peripheral flange 98 which overlies the outer end face of the sleeve 95. A drop of solder 99 may close the outer end of the metallic sleeve 97 at the flange 98. A fine wire 100 is disposed in the passage in the body 95, one end being secured to the metallic bushing 97 by the solder 99. The other end of the wire 100 extends beneath the inner end of the fiber sleeve 96 and is wedged between the outer periphery of the sleeve 96 and the side wall of the cup-shaped portion of the cap 93, so as to provide an electrical connection between the flange 98 of the sleeve 97 and the metallic cap 93 which closes one end of the powder chamber of the cartridge shell.

Figures 12, 13, 14:
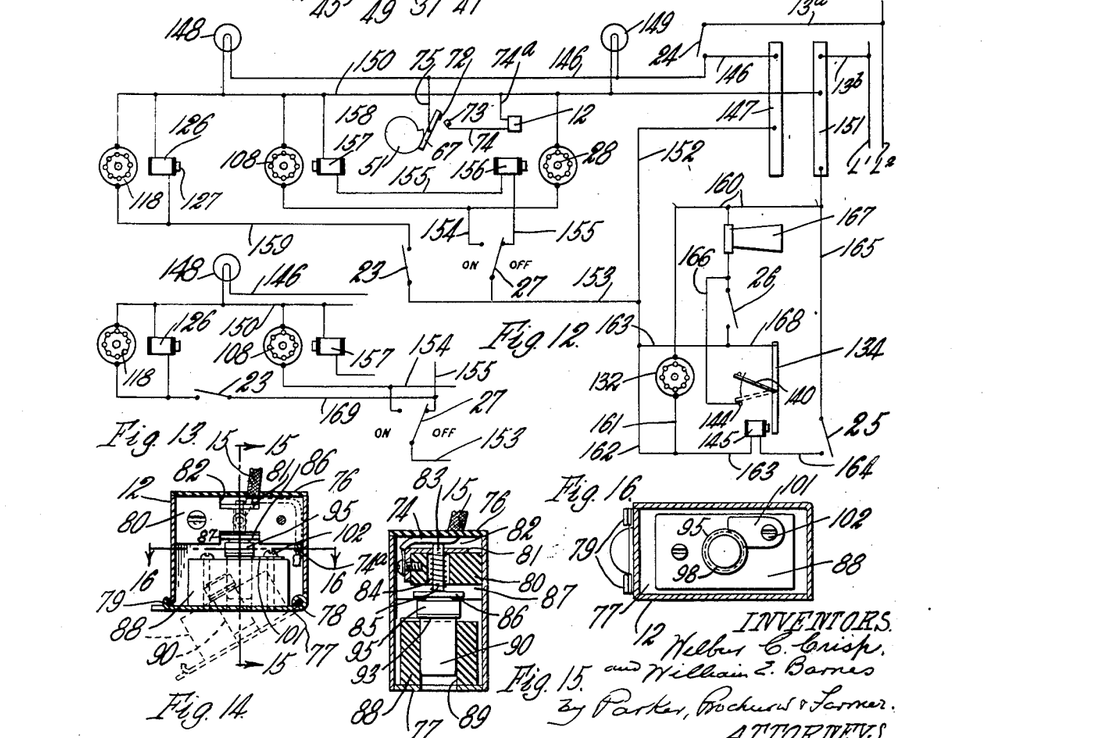
Fig. 12 is a wiring diagram of the circuits contained in the improved timer.
Fig. 13 is a diagram of a portion of the circuit shown in Fig. 12, but illustrating a slight modification of a portion thereof.
Fig. 14 is a sectional elevation through the mechanism for maintaining the cartridge in a position to be fired.

A metallic plate or strip 101, Figs. 14 to 16, is disposed on the inner end face of the insulating block 88, so as to extend up to the passage 89 in which the cartridge shell is placed, where it will be engaged by the peripheral portion of the metallic cap 93 on the cartridge shell 90. The strip 101 is anchored in position by a screw 102 which passes through the strip 101, through the insulating block 88, and is threaded into the metallic end wall 77 of the housing. When a cartridge is in place in the housing, a circuit is established through the cartridge as follows:

From wire 74 to angular plate 81, through the spring 85 to the plunger 83, thence through the flanged head 86 of the plunger to the flanged end 98 of the cartridge, thence through the fine wire 100 to the metallic cap 93, then through plate or strip 101, screw 102 and hinged end wall 77 of the housing to the housing casing to which the wire 74a is grounded. Thus when the switch arm 67 engages the contact 73, the circuit from the line wires will be completed through the wire 100 of the shell. Since the wire 100 is a fine wire, current through it makes it hot or incandescent, and the heat therefrom passing through the aperture 94 ignites the powder charge 92 and explodes the blank cartridge, thus audibly indicating the end of a contest period.

The spectator's clock 11 will next be described. The visual indicating hand 20 of this clock is mounted on a reduced hub of a bushing 103 (Fig. 5) by means of a screw 104 and a dished washer 105, and the bushing 103 is detachably connected by a screw 106 to one end of a hand shaft 107. The shaft 107 is rotatably mounted in a pair of spaced frame plates 109 and 109a. A constant speed, electric motor 108, preferably of the alternating current, synchronous type, is mounted at one side of the plate 109a and acting through a suitable reduction gearing 110, drives a pinion 110a in the manner commonly employed in synchronous motor clocks. The pinion 110a meshes with and drives the gear 111 provided on a spindle 112, and a pinion 113 provided on the spindle 112 meshes with and drives a gear 114. The gear 114 is rotatably mounted on a spool-like bushing 115 which is carried by and rotates with the shaft 107, with a dished washer 116 acting between the bushing 115 and the gear 114 to provide a frictional drive between the gear 114 and the shaft 107. The shaft 107 also carries a gear 117 by which the hand may be reset.

The resetting mechanism for the hand 20 will now be described. A resetting motor 118, Fig. 3, similar to motor 108, acts through a reduction gearing similar to the gearing of the hand operating motor 108 to drive a gear 119. An arm 120 is pivoted at 120a to the frame of the resetting motor and extends across the axis of rotation of the gear 119. A gear 121 is rotatably mounted, by a pin 122, on the arm 120 so as to mesh with the gear 119, and a gear 123 is rotatably mounted, by pin 124, on the arm 120 so as to mesh with the gear 121. When the arm 120 is given a limited rocking movement in one direction, the gear 123 will be carried into meshing engagement with the gear 117 which is mounted on the hand shaft 107. During this limited movement of the arm 120, the gear 121 will remain in mesh with the gear 119 and hence the gear 119 will act through the gear 121 and the gear 123 to drive the gear 117 and through it rotate the hand shaft 107.

Figure 3:
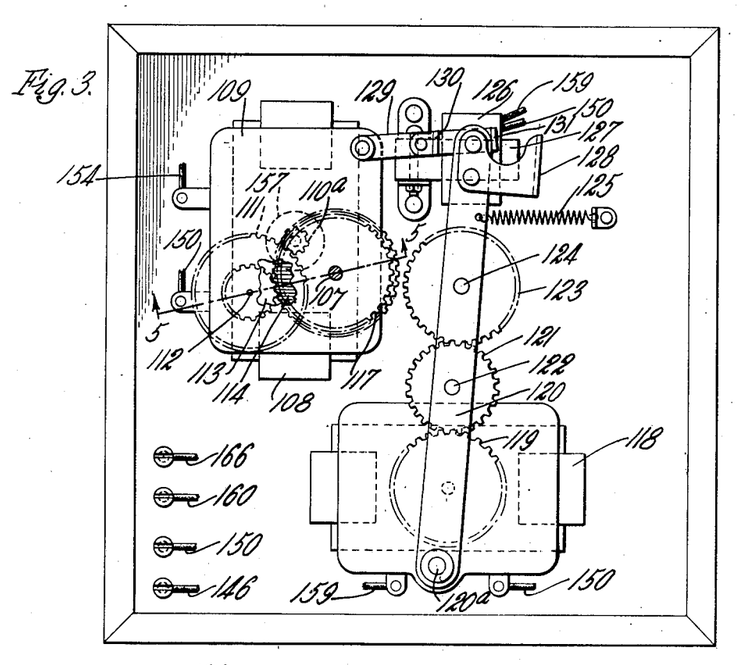
Fig. 3 is the sectional elevation through the spectator's clock, to illustrate the mechanism for operating the time indicating hand.

A spring 125, acting between the arm 120 and a suitable part of the frame, resiliently holds the arm 120 in a retracted position such as shown in Fig. 3, in which the gear 123 is near, but out of mesh with, the gear 117. An electromagnet 126 is mounted on the frame of the spectator's clock, adjacent the free end of the pivoted arm 120, and the core 127 of this magnet acts upon an L-shaped armature 128 which is carried by the arm 120, with one arm of the L of the armature extending in front of the end of the core 127. When the magnet 126 is energized, it will attract the armature 128 and rock the arm 120 against the action of spring 125, and carry the gear 123 into meshing engagement with the gear 117 on the hand shaft.

An arm 129 carried upon the frame of the motor 108 carries a stop flange 130 which limits the extent to which the arm 120 may move in a direction to cause a meshing of the gears 123 and 117, so that the gears will mesh properly without undue pressure between them under the pull of the magnet. A flanged stop 131, also provided on the arm 129, is disposed in a position to engage the opposite side of the arm 120 and limit the retraction of the arm 120 under the action of spring 125, so as to prevent the armature 128 from moving too far away from the core 127 of the magnet 126.

The time-out mechanism will next be described. Another constant speed motor 132, Fig. 2, similar to motor 26, acts through a gear reduction mechanism to drive a pinion 133, Figs. 2 and 6. An arm 134 is pivoted at 135 to the motor frame, and is urged by a spring 136 in a direction away from the pinion 133, and into engagement with a stop pin 137 also carried by the motor frame. The pin 137 has the end portion which is engaged by the arm 134 split or cut so as to form a half cylinder eccentric to the axis of the pin, and the pin is bolted or screwed to the frame of the motor, so that by turning the pin 137 through part of a revolution about its longitudinal axis, it provides an adjustable, eccentric stop that limits to different extents the retraction of the arm 134.

A gear 138 is rotatably mounted by a pin 139 on the arm 134, and is shiftable into and out of meshing engagement with the pinion 133 upon a rocking of the arm 134. The pin 139 is fixed to the gear 138 so as to rotate therewith and also carries a switch arm 140. A spring 141 anchored to the arm 134 acts upon the arm 140 to urge it into a retracted position in which it abuts against an adjustable stop 142. The direction of rotation of the pinion 133 is such that when the gear 138 is meshed therewith, it will drive the arm 140 in a direction away from the stop 142. The stop 142 is mounted on a plate 143 of insulating material, and this plate also carries a contact pin 144 in a position to be engaged by the arm 140 after it has travelled through a desired angular distance away from the stop 142. An electromagnet 145 is mounted in a position to attract an armature 146 provided on the arm 134, so that when the electromagnet 145 is energized it will attract the arm 134 and carry the gear 138 into meshing engagement with the pinion 133.

Referring now particularly to the wiring diagram, Fig. 12, the operating current is supplied by line wires L1 and L2 of any suitable commercial source of operating current, which is usually of the 60 cycle, alternating current of regulated frequency. One of the wires 13a forming part of the twin wire 13, connects the line wire L2 to one side of the switch 24, the other side of the switch 24 being connected by a wire 146 to a bus bar 147 in the control box, to a light 148 for the spectator's clock, and to a light 149 provided within the control box 10 to illuminate the dial cylinders 46 and 56. A common return wire 150 also connects the lights 148 and 149 to another bus bar 151, which is connected by a wire 13b of the twin wire 13 to the other line wire L1. The bus bar 147 is also connected by wires 152 and 153 to the central contact of the double throw switch 27, provided on the panel 21.

One end terminal of the switch 27 is connected by a wire 154 to the motor 108 of the spectator's clock, which drives the hand 20 to indicate the passage of time during a contest period. The wire 154 is also connected to the motor 28 which drives the dial cylinders 46 and 56 in the control box. The motors 108 and 28 are also connected to the common return wire 150. The other end terminal of the switch 27 is connected by a wire 155 to an electromagnet 156 which is associated with the motor 28, and to another and similar electromagnet 157 which is associated with the motor 108 of the spectator's clock. The two electromagnets 156 and 157 are in series with one another, and the electromagnet 157 is connected by a wire 158 to the common return wire 150.

The electromagnet 156 (see also Fig. 2) is disposed in axial alignment with and adjacent the rotor of the motor 28, so that when the electromagnet 156 is energized, it will set up a magnetic field in which the rotor of the motor turns. By means of eddy currents induced in the rotor by such magnetic field, a magnetic brake is applied to the rotor which promptly stops its rotation. When the switch 27 is moved into the full line position (Fig. 12) to open the circuit to the motors 28 and 108, it automatically closes the circuit to the electromagnets 156 and 157, and when moved into a position to close the circuits to motors 28 and 108, it opens the circuit through the electromagnets 156 and 157.

The electromagnets 156 and 157 are thus energized only when the current to the motor is cut off. Thus when the current to the motor 28 is cut off, the electromagnet 156 which is disposed in proximity to the rotor of the motor 28, will immediately stop the rotor so as to reduce to a minimum the drift of the rotor and the parts driven thereby. Otherwise the time indicating parts, and the operating mechanism therefor might, by inertia, continue to operate or drift to some extent after the power to the motor is cut off. The electromagnet 157 is similarly arranged in inductive relation to the rotor of the motor 108 as shown in Fig. 5, so as to stop the drift of the indicating hand 20 of the spectator's clock.

The wire 153 is also connected to one side of the switch 23 on the control box panel 21, the other side of switch 23 being connected by a wire 159 to one side of the resetting motor 118 of the spectator's clock, and also to one side of the electromagnet 126 which rocks the arm 120 in a direction to couple the resetting motor to the time indicating hand 20. The other side of the motor 118 and of the electromagnet 126 are also connected to the common return wire 150. A wire 160 connects the bus bar 151 to the time-out motor 132, the other side of that motor being connected by wires 161 and 162 to the wire 152. Thus when the switch 24 is closed, a circuit will be immediately established from the line wires L1 and L2 through the bus bars 147 and 151 to the time-out motor 132.

The electromagnet 145 of the time-out device is connected at one side by a wire 163 to the wire 162, and at its other side by a wire 164 to one side of the switch 25. The other side of switch 25 is connected by wire 165 to the wire 160 leading to the bus bar 151. Thus by closing the switch 25, a circuit is established to the electromagnet 145 which shifts the gear 138 into meshing engagement with the pinion 133 of the time-out motor, which starts an operation of the time-out switch arm 140. The contact pin 144 of the time-out device is connected by a wire 166 to an electric horn 167, the other side of the horn being connected to the wire 160.

The arm 134 of the time-out device is connected by a wire 168 to the wire 162 so that when the contact arm 140 of the time-out device is operated by its motor into a position to engage the contact pin 144, a circuit will be established from bus bar 147 through wires 152 and 168, arm 134, switch arm 140, pin 144, wire 166, horn 167, and wire 160 to the other bus bar 151. The closing of this circuit sounds the horn 167 which audibly indicates the end of a time-out period. The time keeper then immediately opens the switch 25 which stops the sounding of the horn, and immediately operates the switch 27 to the "on" position to resume the measurement of the time for the main contest period. The teeth of the pinion 133 and gear 138 which are the usual spur type gear teeth, will cause a camming of the gear 138 to one side if the motor of the time-out mechanism continues to operate after the arm 140 has engaged contact pin 144 for any appreciable interval of time. The arm 140 is sufficiently flexible so as to allow some duration of the contact and then if the motor 118 continues to rotate, the gear 138 and arm 134 will be cammed to the right in Fig. 2 sufficiently to release the arm 140 which then returns partially or entirely to resetting position. The arm 140 would then be again forwarded towards contact 144 and this operation repeated. This is an unusual situation which can only happen when the operator disobeys instructions and is clearly negligent.

The switch 26 is connected at one side to the wire 163 and at its other side to the wire 166 and when closed it completes a circuit through the horn 167 in shunt to the switch formed of the arm 140 and contact pin 144. This enables the time keeper to sound the horn 167 at will merely by closing the switch 26. The wire 75 from the cartridge explosion switch 67 is connected to the wire 146, and the wire 74a from the cartridge firing device 12 is connected to the common return wire 150.

In Fig. 13 I have illustrated a slight modification of the circuit shown in Fig. 12, in which the switch 23, instead of being connected to the wire 153 as in Fig. 12, is connected by a wire 169 to the wire 155 on the "off" side of the switch 27. With this arrangement the closing of the switch 23 will not start an operation of the resetting motor, unless the switch 27 is in a position in which the motor 108 operating the spectator's clock hand is shut off, thus making it impossible for the two motors 108 and 118 to attempt to drive the spectator's clock hand 20 at different speeds or in different directions.

*Operation*

The operation of the device in connection with a basketball game will now be explained. With the parts connected, as shown in Fig. 12, the time keeper pulls out the resetting button 59 until the pinion 61 meshes with the gear 52, and then the button 59 is rotated to operate the dial train connecting the dial drums 46 and 56 until they indicate, at the windows 22, a reading of exactly twenty minutes and no seconds, which is the starting position. The time keeper then presses the button 59 inwardly into the position shown in Fig. 2, in which the pinion 61 is disconnected from the dial train shown in Fig. 8. With the dial cylinder 46 in this starting position, the cam 51 will have an angular position such that the shoulder 66 is somewhat past the flanged end 70 of the switch arm 67, with the contacts 72 and 73 separated.

It is now possible safely to insert a blank cartridge in the firing device 12. To do this, the hinged wall 77 is unlatched and swung through the dotted line position shown in Fig. 14 to expose the inner end face of the insulating block 88. A blank cartridge, such as shown in Fig. 7, is then inserted in the passage 89 as shown in Figs. 14 and 15, after which the hinged wall 77 is swung into closed position and latched, as shown by the full lines in Figs. 14 and 15. When the hinged wall 77 is swung into closed position in this manner, the head of the cartridge is carried into endwise engagement against the head 86 of the plunger 83, shifting the latter slightly against the action of the spring 85 which completes a circuit through the cartridge, except for the separation of contacts 72 and 73. At this time the switch 27 is in the "off" position.

The main switch 24 may now be closed, which connects the line wires L1 and L2 to the control box 10. When this occurs the electric lights 148 and 149 will be lighted so as to illuminate the dial of the spectator's clock 11 and the cylinder dials of the control box 10. The time keeper closes the switch 23 which energizes the electromagnet 126 to couple the resetting motor 118 to the gear 117 on the shaft of the spectator's clock hand 20, at the same time completing the circuit through the resetting motor 118. The motor 118 thus drives the hand 20 of the spectator's clock at a desired rate until the hand 20 reaches the position indicating the start of a contest period, which will be twenty minutes in the case of a basketball game. In the type of spectator's clock illustrated, the zero and twenty minute positions are the same, so that the indicating hand 20 will rotate once in twenty minutes unless stopped for time-out periods.

When the hand 20 reaches the starting position shown in Fig. 1 the time keeper opens the switch 23 which stops the resetting motor 118, and through the energization of the electromagnet 126 uncouples the resetting motor from the hand 20. The device is now ready to time a contest. To start the game the time keeper may momentarily depress the switch 26 one or more times as may be necessary to sound the horn 167 a similar number of times, and thus audibly indicate to the players and to the spectators that the contest is about to start. At the start of the game the time keeper may momentarily operate the switch 26 again to sound the horn 167 to indicate that the game is starting and at the same time the time keeper throws the switch 27 to the "on" position. The motor 28 in the control box now operates at a constant speed to slowly turn the dials 46 and 56, and at the same time the motor 108 of the spectator's clock drives the hand 20 in the direction of the arrow (Fig. 1) to indicate the passage of time.

Whenever either team asks for time out, the time keeper throws the switch 27 to the "off" position, and simultaneously closes the switch 25 to start the operation of the time-out device by energizing the electromagnet 145. When the switch 27 was moved to "off" position, the current to the motors 128 and 108 was discontinued and the electromagnets 156 and 157 were energized to apply magnetic brakes to the rotors of those motors, and quickly stop further travel of the control box dials 46 and 56 and of the hand 20 at the spectator's clock. Immediately upon the closing of the switch 25, the gear 138 of the time-out mechanism was coupled to the continuously rotating pinion 133 driven by the motor 132, and the switch arm 140 began to move away from the full line position shown in Fig. 6.

When the arm 140 engages the pin 144, as shown in Fig. 6, it completes the circuit through the horn 167 and sounds an audible signal that the time-out period which is of predetermined duration, such as one minute, is ended, whereupon the time keeper opens the switch 25 and closes the switch 27. When switch 25 is opened, the electromagnet 145 is deenergized, the gear 138 is uncoupled from pinion 133, and the spring 141 returns the arm 140 to the initial position shown in Fig. 2. The closing of the switch 27 immediately restarted the timer motors 28 and 108 to continue the operation of the time dials 46 and 56 in the control box and the hand 20 of the spectator's clock. Further time-out periods may be allowed in the same manner as above explained, by merely repeating the operation of the switches 25 and 27.

It will be noted that at all times the dials 46 and 56 of the control box and the hand 20 of the spectator's clock will indicate the time remaining in the period yet to be played, and when the minute dial 46 in the control box reaches its zero position, which happens at the same time that the hand 20 reaches the zero position on the spectator's clock, the shoulder 66 of the cam 51 will have moved into alignment with the flanged end 70 of the switch arm 67, whereupon the spring 71 snaps the switch arm 67 in a direction to engage the contacts 72 and 73 which completes a circuit between the bus bars 147 and 151 and through the firing device 12.

The current passing through the fine wire 100 in the cartridge mounted in the firing device 12, will ignite the powder charge 92 in the cartridge, and the resulting firing of the cartridge gives a pronounced audible signal to indicate the end of the contest period. The time keeper then opens the switch 27 and resets the apparatus for a new contest period.

It will be understood that various changes in the details and arrangements of parts, which have been herein described and illustrated in order to explain the nature of the invention, may be made by those skilled in the art, within the principle and scope of the invention, as expressed in the appended claims. It will also be understood that the timing periods may be changed for different games.

We claim as our invention:

1. A timer of the type adapted for the timing of games and contests, which comprises a spectator's clock having a visual time indicating element and a constant speed, electric synchronous motor operating said element and continuously coupled thereto, an observer's time indicating clock having visual time indicating means and a constant speed, electric synchronous motor continuously coupled to said indicating means for driving the same, a source of alternating current, a circuit for each of said motors including said source, a switch in said circuits and operable between "on" and "off" positions, for simultaneously controlling the operation of both of said motors so as to start the same together at will when said switch is in "on" position and stop it when in "off" position, a magnetic brake associated with each motor and operable when energized, to stop the motors quickly and thereby decrease the drift of the motors, said indicating element and said indicating means, and an electric circuit for each of said magnetic brakes, both brake circuits receiving operating current from said source and also controlled by said switch and rendered effective upon the operation of said switch into "off" position to open the circuit to the motors.

2. A timer of the type adapted for the timing of games and contests which comprises mechanism with visual indicating means, a constant speed electric motor for driving said mechanism so as to indicate the passage of time by said means, control means for rendering said motor effective to start and stop the operation of said mechanism with its indicating means, a switch closed by said motor and mechanism when said indicating means reaches a predetermined position indicating the end of a contest period, a cartridge shell having therein a powder charge and a heating wire positioned to ignite said charge, and a circuit including said switch and said heating wire, whereby when said indicating means reaches a predetermined position indicating the end of a contest period, said switch will be closed and the cartridge fired to audibly indicate the end of the contest period.

3. A timer of the type adapted for the timing of games and contests, which comprises a spectator's clock having a visual time indicating element and a constant speed, electric motor connected to said element for driving it in a direction to indicate the passage of time, means including a switch for controlling the operation of said element by said motor so as to start and stop the operation of said element at will, a resetting motor, a pivoted arm, gearing on said arm driven by said resetting motor and shiftable with said arm into and out of driving relation to said indicating element, for driving said indicating element, when said gearing is in driving relation to said indicator element, at a faster rate than it is driven by the constant speed motor for resetting it, and means including a switch for controlling the swinging of said arm to couple or uncouple said resetting motor and said indicating element.

4. A timer of the type adapted for the timing of games and contests, which comprises a spectator's clock having a visual time indicating element and a constant speed, electric motor connected to said element for driving it in a direction to indicate the passage of time, means including a switch for controlling the operation of said element by said motor so as to start and stop the operation of said element at will, resetting means operable, when active, into driving relation to said element and operating said element at a faster rate than said element is driven by said constant speed motor, and manually operated means for controlling the action of said resetting means on said indicating element, by which the resetting of said element may be started and stopped at will, both of said controlling means being interconnected by which said resetting means can be made active on said time indicating element solely while said constant speed motor is inactive on said indicating element.

5. A timer of the type adapted for games and contests which comprises a spectator's clock having visual time indicating means and a synchronous motor for operating it to indicate the passage of time in a contest period, a monitor unit having visual time indicating means and a synchronous motor for operating it to also indicate the passage of time, circuit means for said motors including a common switch by which both motors may be started and stopped simultaneously, a cable forming part of said circuit means connecting said motors whereby the monitor unit may be disposed at a substantial distance from the spectator's clock, a source of alternating current for said motors, electrically controlled brake means for each of said motors operable from the same source of current alternately with said motors by said common switch, whereby when said switch is operated to "off" position to stop the motors, it makes said brake devices effective to stop said motors promptly and thus quickly stop the operation of both visual time indicating means and prevent drift thereof, a resetting motor-operated device at said spectator's clock for returning the visual time indicating means of that clock to starting position, a circuit in said cable for said resetting device leading to said monitor unit, and switch means at said unit in said last named circuit for controlling the operation of said resetting device, said last named circuit also including in series therewith said common switch and being closed through that switch when said common switch is in said "off" position.

6. A timer of the type adapted for games and contests which comprises a spectator's clock having visual time indicating means and a synchronous motor for operating it to indicate the passage of time in a contest period, a monitor unit having visual time indicating means and a synchronous motor for operating it to also indicate the passage of time, circuit means for said motors including a common switch device by which both motors may be started and stopped simultaneously, a cable forming part of said circuit means connecting said motors whereby the monitor unit may be disposed at a substantial distance from the spectator's clock, electrically controlled brake means for each of said motors operable alternately with said motors by said common switch device, whereby when said switch device is operated to "off" position to stop the motors, it makes said brake devices effective to stop said motors promptly and thus quickly stop the operation of both visual time indicating means and prevent drift thereof, a resetting motor-operated device at said spectator's clock for returning the visual time indicating means of that clock to starting position, a circuit in said cable for said resetting device leading to said monitor unit, and switch means at said unit for controlling the operation of said resetting device, the circuit in said cable for said resetting device being controlled by said common switch device for the synchronous motors and rendered effective solely while said switch means for the synchronous motors is in "off" position, in which the synchronous motors are stopped, whereby said resetting device may only be operated while said synchronous motors are idle.

7. A timer of the type adapted for the timing of games and contests which comprises a spectator's clock having visual time indicating means and a synchronous motor for operating it to indicate the passage of time from a starting position, a monitor unit disposed at a substantial distance from the spectator's clock and having visual time indicating means and a synchronous motor for operating it to indicate also the passage of time, a source of alternating current, circuit means from said source for operating and stopping said motors in unison, a magnetic brake operable on the rotor of each motor to stop its operation and prevent drift of said rotors, a circuit also from said source for the brakes of both motors, a switch controlling said motors and said brakes and causing operation of said motors when in "on" position and stopping said motors and causing operation of said brakes when in "off" position, a resetting motor at said spectator's clock, automatic means for coupling said resetting motor to the time indicating means of said spectator's clock whenever said resetting motor is rendered operative, and a circuit including said source of current, a switch at said monitor unit and said switch for said synchronous motors for controlling the activity of said resetting motor, said switches in said last named circuit being in series with one another and connected to close the circuit to said resetting motor solely while said synchronous motor switch is in said "off" position.

8. A timer of the type adapted for the timing of games and contests which comprises a spectator's clock having visual time indicating means and a synchronous motor for operating it to indicate the passage of time from a starting position, a monitor unit disposed at a substantial distance from the spectator's clock and having visual time indicating means and a synchronous motor for operating it to indicate also the passage of time, a source of alternating current, circuit means from said source for operating and stopping said motors in unison, a magnetic brake operable inductively on the rotor of each motor to stop its operation and prevent drift of said rotors, a circuit also from said source for the brakes of both motors, a switch device controlling said motors and said brakes and causing operation of said motors when in "on" position and stopping said motors and causing operation of said brakes when in "off" position, a resetting motor at said spectator's clock, automatic means for coupling said resetting motor to the time indicating means of said spectator's clock whenever said resetting motor is rendered operative, and a circuit also from said source including in series with one another a switch at said monitor unit and said switch for said synchronous motors when in "off" position for controlling the activity of said resetting motor, effective to permit operation of said resetting motor solely while said synchronous motor switch device is in "off" position.

9. A timer of the type adapted for the timing of games and contests, which comprises a visual time indicator, a synchronous motor continuously connected to and driving said indicator at a rate corresponding to the time intervals indicated whenever said motor is operating, a circuit for said motor, a resetting motor, means for drivingly coupling said resetting motor to said indicator and operable to establish or interrupt the driving connection between said resetting motor and said indicator, a circuit for said resetting motor, means responsive to current in the circuit for said resetting motor for causing operation of said coupling means to drivingly couple said resetting motor to said indicator whenever current is supplied to said resetting motor and to uncouple them automatically whenever said circuit to said resetting motor is opened, a switch included in the circuit to said resetting motor for controlling the activity of said resetting motor and also of said coupling means, and switch means included in the circuit for said synchronous motor and operable between an "on" position in which it closes the circuit to said synchronous motor and an "off" position in which it opens said circuit, said circuit to said resetting motor also including in series therein said switch means when in "off" position, whereby said resetting motor cannot be operated while said synchronous motor is operating.

WILBUR C. CRISP.
WILLIAM E. BARNES.